US005240818A

United States Patent [19]

Mignardi et al.

[11] Patent Number: 5,240,818

[45] Date of Patent: Aug. 31, 1993

[54] METHOD FOR MANUFACTURING A COLOR FILTER FOR DEFORMABLE MIRROR DEVICE

[75] Inventors: Michael A. Mignardi, Dallas; Brooks J. Story, Richardson, both of Tex.

[73] Assignee: Texas Instruments Incorporated, Dallas, Tex.

[21] Appl. No.: 739,079

[22] Filed: Jul. 31, 1991

[51] Int. Cl.$^5$ ............ G02B 5/08

[52] U.S. Cl. ............ 430/321; 430/4; 430/312; 430/319; 359/855; 359/884

[58] Field of Search ............ 359/891, 884, 223, 846, 359/883, 855; 358/62, 58, 233, 234; 340/783, 763, 764, 815.01, 815.24, 815.27; 430/321, 320, 4, 7, 312, 313, 319, 272

[56] References Cited

U.S. PATENT DOCUMENTS

| | | | |
|---|---|---|---|
| 4,383,017 | 5/1983 | Hirofumi et al. | 430/7 |
| 4,662,746 | 5/1987 | Hornbeck | 350/269 |
| 4,680,579 | 7/1987 | Ott | 340/783 |
| 4,808,501 | 2/1989 | Chuilli | 430/7 |
| 4,837,098 | 6/1989 | Shimamura et al. | 430/7 |
| 5,055,379 | 10/1991 | Bagchi et al. | 430/289 |
| 5,059,500 | 10/1991 | Needham et al. | 430/7 |
| 5,120,622 | 6/1992 | Hanrahan | 430/7 |

FOREIGN PATENT DOCUMENTS

| | | | |
|---|---|---|---|
| 61-094004 | 5/1986 | Japan | 430/4 |

OTHER PUBLICATIONS

English language abstract of JP 60-090461, "Color Picture Reader", Kotani et al., May 1985.

English language abstract of JP 59-057569, "Color Picture Reader", Saitou et al., Apr. 1984.

English language abstract of JP 02-277019, "Color Separation Type Optical Scanner", Miyazaki et al., Nov. 1990.

Uematsu "Wafer Processes of Color Filter Arrays for Imagers", '86 International Conference in China, 380-382, Oct. 1986.

*Primary Examiner*—Charles L. Bowers, Jr.

*Assistant Examiner*—John A. McPherson

*Attorney, Agent, or Firm*—Brian C. McCormack; James C. Kesterson; Richard L. Donaldson

[57] ABSTRACT

A deformable mirror device comprises a plurality of groups of colored mirrors responsive to electronic signals. Each group of mirrors is coated with a mixture of resist and dye thereby reflecting specified wavelengths of visible light. A process for manufacturing such a color deformable mirror device ("DMD") includes forming a layer of material on the DMD comprising a resist and a dye and selectively removing portions of the layer of material from the DMD.

11 Claims, 2 Drawing Sheets

METHOD FOR MANUFACTURING A COLOR FILTER FOR DEFORMABLE MIRROR DEVICE

RELATED CASE

This application is related to and filed contemporaneously with "Color Deformable Mirror Device and Method for Manufacture," Serial No. 07/739,078, now U.S. Pat. No. 5,168,406 by Nelson.

TECHNICAL FIELD OF THE INVENTION

This invention relates generally to the field of electronic devices and more particularly to deformable mirror devices.

BACKGROUND OF THE INVENTION

Deformable mirror devices ("DMDs") are semiconductor devices containing at least one row of deflectable mirrors. The mirror position, which is controlled electronically, determines the path of reflected incident light. Deformable mirror devices may be manufactured with any number of mirror rows. By using high density mirror arrays, reflected light from the individual mirrors can be combined to form visual images.

The introduction of color to deformable mirror device systems has been problematic to date. One approach to full color deformable mirror device systems is to use three deformable mirror devices, each with a different primary color source or external color filter. The three monochrome deformable mirror device images are combined into a single image to produce the desired three color picture. This system has the disadvantages of complex chip alignment, output convergence, and excessive cost and package size of the related optic system.

The preferred approach to color light modulation, therefore, is to use a single deformable mirror device chip modified to produce the desired color image. Simply aligning a matrix of colored windows above the matrix of individual mirrors, however, is not satisfactory. The unmodulated light striking the deformable mirror device is supplied externally to the individual mirrors and off of the final viewing optical axis. Consequently, incident light would pass through the filter window structure twice before being observed with the possibility of passing through two different colored window elements. The optical alignment for using such an off-chip color filter window is complex.

Therefore a need has risen for a single chip deformable mirror device operable to accurately reproduce full color images.

SUMMARY OF THE INVENTION

In accordance with the present invention, a deformable mirror device is provided which substantially overcomes problems associated with producing color deformable mirror device systems.

A deformable mirror device is disclosed comprising a plurality of deformable mirrors. The mirrors are operable to selectively reflect incident light responsive to electronic signals. The mirrors are divisible into at least two groups. Each group is coated with a mixture of dye and resist causing the mirrors to reflect a particular wavelength or wavelengths of the incident light thus producing the characteristic of at least two colors.

One technical advantage of the disclosed invention is the ability to precisely and accurately place colors on individual mirror elements of a deformable mirror device. The particular colors may be arranged so as to create a full color display when viewed at the macroscopic level.

It is another technical advantage that the disclosed process applies a thin layer of dye-resist to the deformable mirror device array. The thinness of the layer minimizes the induced stresses within the mirror element.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention is best understood by reference to FIGURES 1–4, like numerals corresponding to similar parts of the various drawings.

Heretofore, use of deformable mirror devices has been confined to monochromatic reflection of light. A more complete understanding of present-day deformable mirror devices and their use may be had by referring to "Spatial Light Modulator Printer and Method of Operation," U.S. Pat. No. 4,662,746 to Hornbeck et al., filed Oct. 30, 1985. This patent is incorporated herein by reference.

Figure 1:
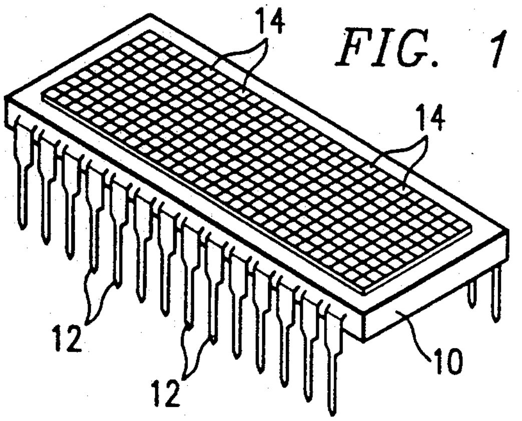
FIG. 1 shows a deformable mirror device in perspective.

FIG. 1 depicts schematically a deformable mirror device 10. Electronic control signals are input to DMD 10 through pins 12. DMD 10 comprises individually addressable mirror elements 14. In the present invention, mirror elements 14 may be produced in a wide variety of sizes but are typically 20 $\mu m \times 20$ $\mu m$ in size. Mirror elements 14 may be arranged in an $n \times m$ array as depicted in FIG. 1, in a single thin line, or in several separate lines. In the present invention, mirror elements 14 are individually colored during the manufacturing process as will be more fully described below. By properly selecting the color pattern on mirror elements 14, and therefore the color of reflected incident light, DMD 10 may reflect white light to produce full color images.

Figure 2:
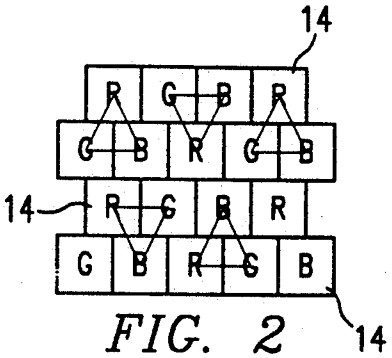
FIG. 2 depicts a diagrammatic view of a typical three-color pattern suitable for creating full color images.

FIG. 2 illustrates one example of a three-color mapping scheme applicable to deformable mirror device 10 (FIG. 1). In this scheme, "R"=red, "G"=green, and "B"=blue. By staggering the three primary colors on mirrors 14 as depicted, three individual mirrors may be operated jointly to produce a larger individual full color pixel. Three adjacent mirrors 14, as indicated by the overlying triangles, create a pixel which is capable of displaying any combination of the three colors.

Figure 3:
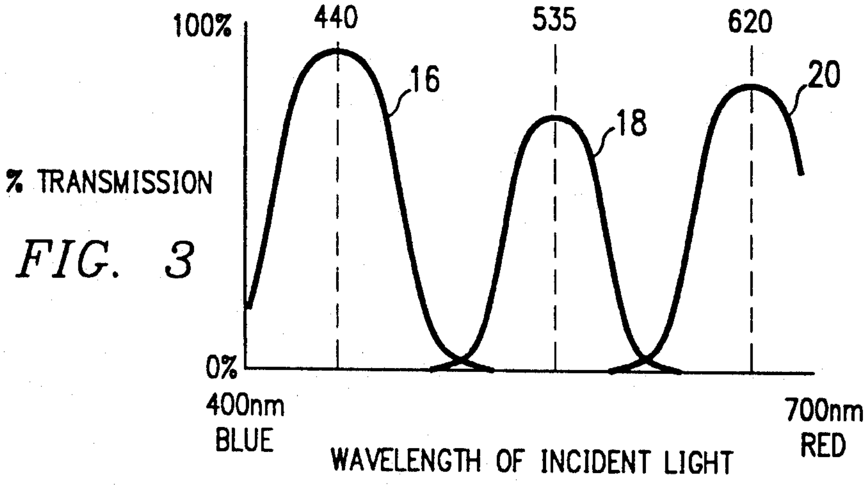
FIG. 3 depicts graphically a color transmission profile of three dyes suitable to create full color images when used jointly.

FIG. 3 depicts graphically the color transmission profile of a typical ternary system of primary colors that could be used in the staggered arrangement of FIG. 2. Single color filters in this system would have transmission peaks centered around 440 (blue), 535 (green) or 620 (red) nanometers. These colors correspond to profiles 16, 18 and 20 respectively.

The anthraquinone and phthalocyanine families of organic dyes are suitable to produce light transmission profiles depicted by curve 16 in FIG. 3 when applied to a mirrored surface. The azo family of organic dyes is suitable to produce light transmission properties depicted by curve 20. These two sets of dyes may be combined to form a dye with light transmission characteristics depicted by the central curve 18. The resist and dye are together dissolved by a suitable solvent such as toluene or xylene. The two may be combined in ratios varying from one-to-one to four-to-one (mass of resist to mass of dye) depending on desired color intensity.

EXAMPLE 1

(Blue dye-resist mixture). A solution is prepared comprising 1.46 grams of positive electron beam resist and 4.0 grams of toluene. A separate solution comprising 1.25 grams of Solvent Blue 35 dye, 1.0 gram of Solvent Blue 67 dye, and 29.9 grams of toluene is refluxed for four hours under nitrogen. Solvent Blue 35 may be obtained from BASF Corp. under the name of "SUDAN BLUE 670." Solvent Blue 67 may be obtained from the Ciba-Geigy Corp. under the name "ORASOL BLUE GN." The blue dye solution is cooled and filtered. After filtering, the total dissolved dye content is 6.8%. The resist solution and 15.0 grams of the blue dye solution are combined and filtered to remove any undissolved material. The resulting dyed resist solution is stirred uncovered until enough toluene evaporates to leave a total dissolved solids (polymer and dye) content of 27.8%. The blue dyed resist is deposited onto the DMD substrate by spin coating at 2000 RPM and baked in air for 30 minutes at 120° C.

EXAMPLE 2

(Green dye-resist mixture). A solution is prepared comprising 1.9 grams of positive electron beam resist and 4.5 grams of toluene. A separate solution comprising 4.0 grams of Solvent Blue 67 dye, 3.0 grams of Solvent Yellow 56 dye, and 70 grams of toluene is refluxed for four hours under nitrogen. Solvent Yellow 56 may also be obtained from BASF under the name "SUDAN YELLOW 150." The green dye solution is cooled and filtered. After filtering, the total dissolved dye content is 7.5%. The resist solution and 23.0 grams of the green dye solution is combined and filtered to remove any undissolved material. The resulting dyed resist solution is stirred uncovered until enough toluene evaporates to leave a total dissolved solids (polymer and dye) content of 23%. The green dyed resist is deposited onto a substrate by spin coating at 2000 RPM and baked in air for 30 minutes at 120° C.

EXAMPLE 3

(Red dye-resist mixture). A solution is prepared comprising 0.75 grams of positive electron beam resist and 1.83 grams of toluene. A separate solution comprising 2.5 grams of Solvent Red 24 dye and 20.0 grams of toluene is refluxed for sixteen hours under nitrogen. Solvent Red 24 may be obtained from BASF under the name "SUDAN RED 380." The red dye solution is cooled and filtered. After filtering, the total dissolved dye content is 11.1%. The resist solution and 3.42 grams of the red dye solution is combined and filtered to remove any undissolved material. The red dyed resist was deposited onto a substrate by spin coating at 1500 RPM and baked in air for 30 minutes at 120° C.

FIGS. 4*a–f* depict cross-sectional views of DMD 10 during various stages of fabrication. A more complete understanding of monochrome DMD fabrication may be had by referring to U.S. Pat. No. 4,662,746 issued on May 5, 1987 to Hornbeck, entitled "Spatial Light Modulator and Method," which is incorporated herein by reference.

Figure 4A:
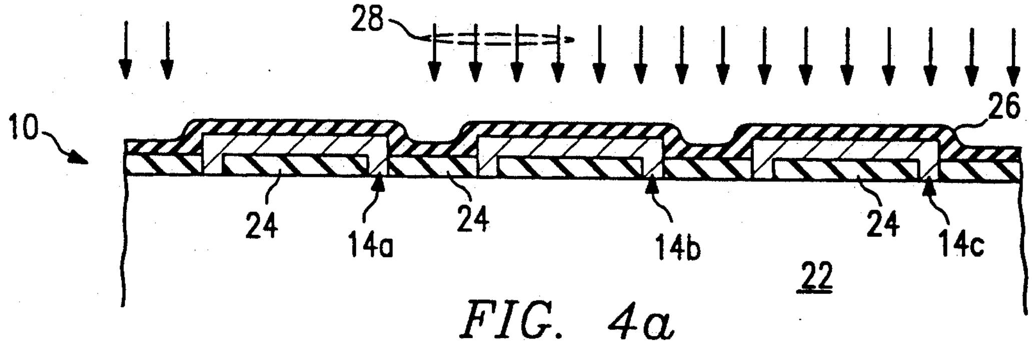
FIGS. 4*a–f* depict cross-sectional side views of a deformable mirror device during various stages of fabrication.

In FIG. 4*a*, mirror elements 14*a–c* have been constructed on top of substrate 22 but sacrificial layer 24 has not been undercut at this stage. Substrate 22 contains but does not depict the circuitry necessary to control mirrors 14*a–c* according to input signals. A layer 26, comprising a mixture of resist and dye, is uniformly applied to DMD 10. The resulting dye-resist layer is typically from 1 to 3 microns in thickness. Layer 26 has the characteristic of one of the three colors depicted in connection with FIG. 3. Layer 26 is then masked and exposed to, for example, ultraviolet light (indicated by arrows 28) such that when treated with an etchant or developer, layer 26 is removed from all mirrors not desired to be colored. In the example of FIGS. 4*a–f*, layer 26 is part positive resist and will be removed from all mirrors except mirror 14*a*. Patterning of layer 26 results in the coating of approximately one-third of the mirrors with one component of the ternary color system.

Figure 4B:
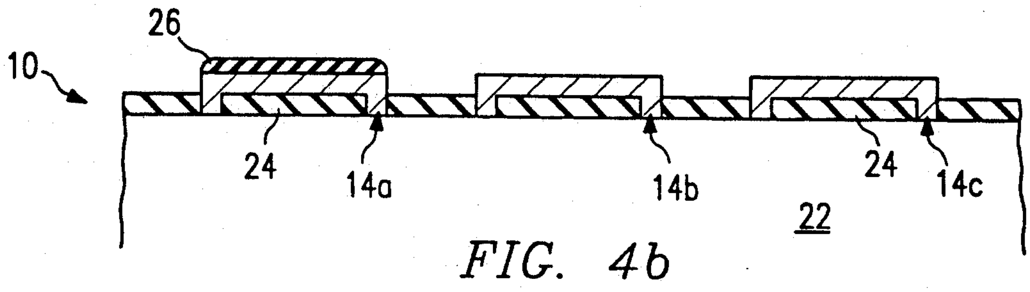

FIG. 4*b* depicts DMD 10 after layer 26 has been etched from all undesired mirrors.

Figure 4C:
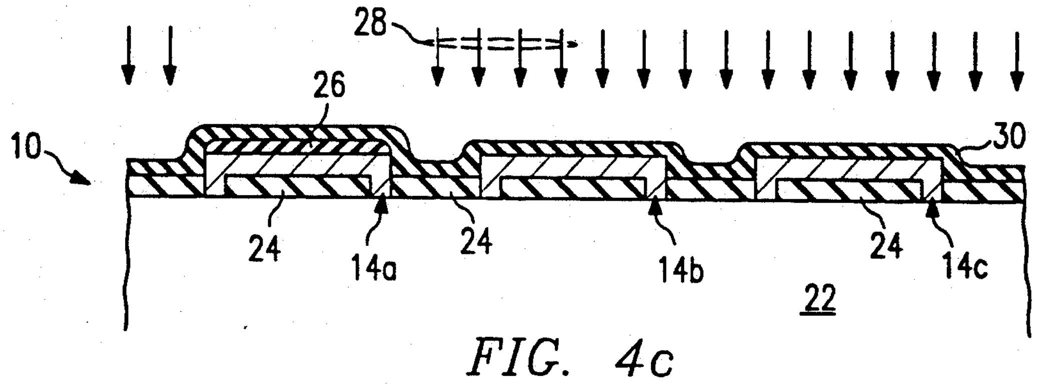

FIG. 4*c* depicts DMD 10 after protective layer 30 has been deposited over the entire device. Layer 30 is then patterned using conventional microlithographic techniques such that only the mirrors previously coated with dye resist layer 26 (here mirror 14*a*) are covered with the protective coating. Protective layer 30 should be optically transparent, such as a thin layer of silicon dioxide. Protective layer 30 will protect layer 26 from being etched during subsequent processing steps. It may be possible to fabricate the colored mirrors without protective layer 30 by using etch-resistant resists.

Figure 4D:
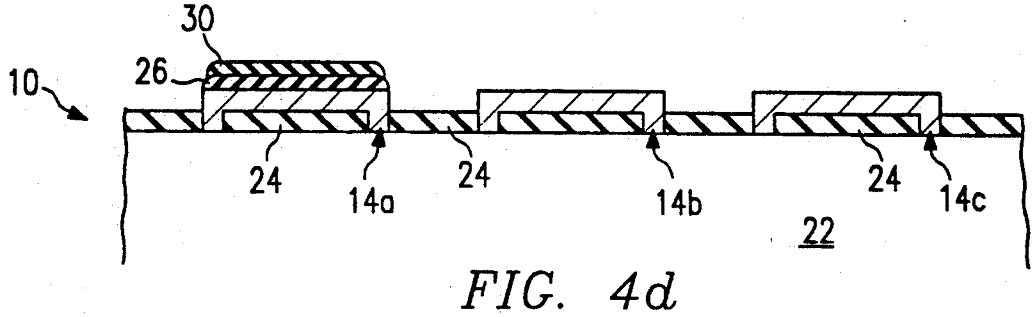

FIG. 4*d* depicts DMD 10 after protective layer 30 has been etched from all mirrors other than mirror 14*a*.

Figure 4E:
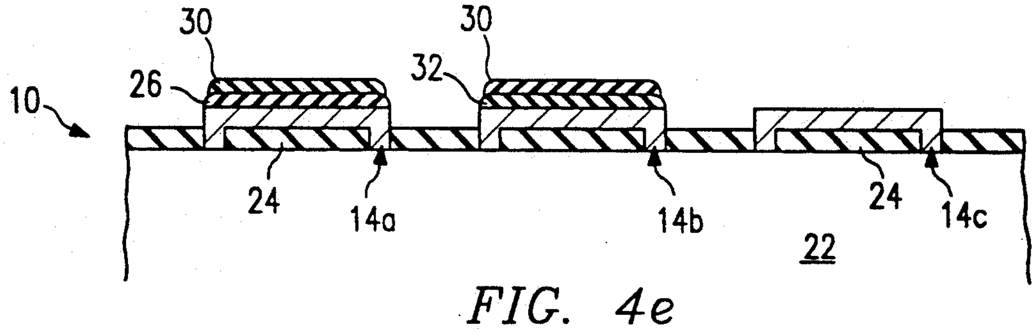

In FIG. 4*e*, a second colored layer of dyed resist has been applied to DMD 10, patterned, and etched as described in connection with FIGS. 4*a* and 4*b*. Layer 32 comprises a resist and a dye or dyes necessary to form the second of the three color filters. After patterning, layer 32 covers the second third of the mirrors, corresponding to mirror 14*b*. Layer 32 is then coated by a protective layer 30 as described in connection with FIGS. 4*c* and 4*d*.

Figure 4F:
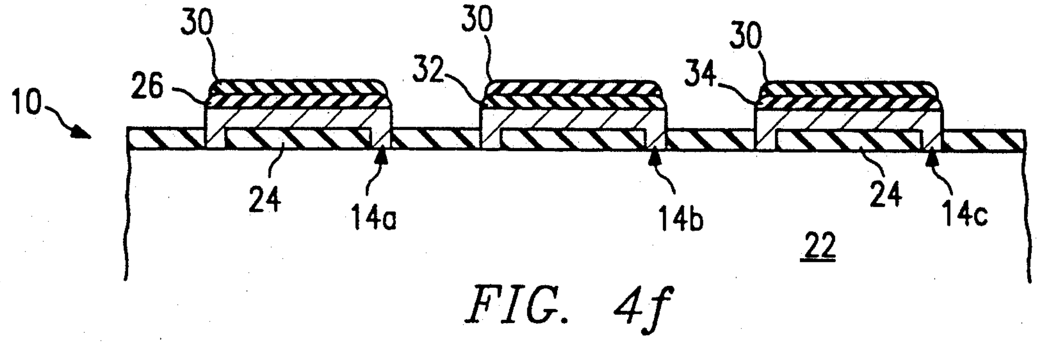

FIG. 4*f* depicts the complete ternary color filter system for DMD 10. Here, the third layer of dyed resist, layer 34, has been applied to DMD 10, patterned and etched as described in connection with FIGS. 4*a* and 4*b*. Layer 34 comprises a resist and a dye or dyes necessary to form a third color filter. After patterning, layer 34 covers the final third of the mirrors, corresponding to 14*c*. Layer 34 is then coated by protective layer 30 as described in connection with FIGS. 4*c* and 4*d*.

Layers 26, 32 and 34 are deposited and patterned using conventional microlithographic techniques. Each layer, however, may be processed by different techniques, such as UV, deep UV, electron beam, ion beam, or x-ray lithography, and may comprise different resists.

The final stage in DMD fabrication is the undercutting of the mirrors. This is accomplished by removal of sacrificial layer 24 using selective etching techniques. The removal of layer 24 allows for bistable or tristable operation of the mirrors.

Although the present invention and its advantages have been described in detail, it should be understood the various changes, substitutions and alterations can be made herein without departing from the spirit and scope of the invention as defined by the appended claims.

What is claimed is:

1. A method of forming a color deformable mirror device, the method comprising the steps of:

microlithographically forming an array of individual deformable mirrors;

microlithographically forming a layer of material comprising a dye and a resist over said array of mirrors; and removing portions of said material not overlying a first set of desired mirrors of said array of mirrors.

2. The method of claim 1 and further comprising the step of applying a transparent protective layer over the remaining layer of material.

3. The method of claim 2 wherein said applying step further comprises the step of applying a layer of silicon dioxide.

4. The method of claim 1 wherein said stp of microlithographically forming said layer of material comprising said dye and said resist comprises the stops of:

combining a resist and a dye selected from the group consisting of anthraquinone, phthalocyanine, azo, and mixtures thereof; and applying the combination of resist and selected dye to said array of mirrors.

5. The method of claim 4 and further comprising the step of applying a transparent protective layer over the remaining layer of material.

6. The method of claim 1 and further comprising the steps of:

microlithographically forming a second layer of material comprising a dye and a resist over said array of mirrors;

removing portions of said second layer not on a second set of desired mirrors;

microlithographically forming a third layer of material comprising a dye and a resist over the deformable mirror device; and removing portions of said third layer not on a third set of desired mirrors.

7. The method of claim 6 wherein each of said forming steps further comprises the step of combining a resist and a dye selected from the group consisting of anthraquinone, phthalocyanine, azo, and mixtures thereof.

8. The method of claim 7 wherein each of said forming steps further comprises the step of aligning and removing said portions of each of said layers of material to form three-color pixels.

9. A method of forming a color deformable mirror device, the method comprising the steps of:

microlithographically forming an array of individual deformable mirrors;

microlithographically forming a layer of material comprising a first color dye and a resist over said array of mirrors;

removing portions of said material not overlying a first set of desired mirrors of said array of mirrors;

microlithographically forming a second layer of material comprising a second color dye and a resist over said array of mirrors;

removing portions of said second layer not overlying a second set of desired mirrors;

microlithographically forming a third layer of material comprising a third color dye and a resist over the deformable mirror device; and removing portions of said third layer not overlying a third set of desired mirrors.

10. The method of claim 9 wherein each of said mirrors of each of said desired sets of mirrors is grouped with a corresponding one mirror of each of the other two sets of desired mirrors to form a larger individual full color pixel.

11. The method of claim 10 wherein said first color is red, said second color is blue, and said third color is green.

* * * * *